United States Patent [19]

Sonnenberg et al.

[11] Patent Number: 5,075,346

[45] Date of Patent: Dec. 24, 1991

[54] TERTIARY ETHERS AS BLOWING AGENTS FOR FOAM POLYMER SYSTEMS

[75] Inventors: Fred M. Sonnenberg, Merion; Joseph A. Verdol, Philadelphia, both of Pa.

[73] Assignee: Arco Chemical Technology, Inc., Wilmington, Del.

[21] Appl. No.: 620,869

[22] Filed: Dec. 3, 1990

[51] Int. Cl.$^5$ .............................. C08J 9/14; C08J 9/18
[52] U.S. Cl. ................................ 521/60; 264/DIG. 5; 521/56; 521/79; 521/81; 521/88; 521/114; 521/143; 521/146; 521/150; 521/910
[58] Field of Search ................. 521/88, 114, 143, 146, 521/150, 56, 60, 79, 81, 910; 264/DIG. 5

[56] References Cited

U.S. PATENT DOCUMENTS 2,676,927  4/1954  McCurdy et al. ..................... 521/88
2,911,381  11/1959  Roth ..................................... 521/88
3,293,196  12/1966  Nakamori ............................. 521/88

Primary Examiner—Morton Foelak
Attorney, Agent, or Firm—Lewis J. Young

[57] ABSTRACT

The use of tertiary ethers as blowing agent allows the preparation of lower density foams from many types of polymeric materials.

10 Claims, No Drawings

TERTIARY ETHERS AS BLOWING AGENTS FOR FOAM POLYMER SYSTEMS

BACKGROUND OF THE INVENTION

The present invention relates to the expanding of various polymers to low density foams using novel blowing agents selected from the tertiary ethers, such as methyl tert-butyl ether, methyl tert-amyl ether, and ethyl tert-butyl ether.

The preparation of molded foamed plastic articles is well known wherein plastic particles are impregnated with organic blowing agents, expanded to preliminary low density particles, placed into a mold and finally heated to fill the mold and fuse the particles into the final article.

The most common polymer to be foamed commercially is polystyrene. For this polymer, the most common blowing agents are selected from the aliphatic hydrocarbons containing 4 to 6 carbon atoms in the molecule, including butane, pentane, cyclopentane, hexane, and cyclohexane. Unfortunately, these hydrocarbons are now considered to be hazardous to the atmosphere in the quantities which are released during the molding process.

Many other polymers would be useful in foam applications, but the hydrocarbon blowing agents are not soluble enough, or not retained for sufficient time in the other polymers to allow formation of desirable foams.

The Freon type blowing agents have greater solubility in polymers, less flammable, and were found to be suitable for many foam products, but have now been found to be detrimental to the ozone layers in the atmosphere.

BRIEF SUMMARY OF THE INVENTION

We have now found that certain tertiary ethers have high polarity, greater solubility in most polymers, and are relatively stable to oxidation. Because of these properties, the tertiary ethers have been found to be excellent blowing agents for a wide variety of polymers. Foams can be made having lower density and acceptable cellular structure.

DETAILED DESCRIPTION OF THE INVENTION

The present invention is an improvement in a process for foaming polymers and copolymers by impregnating polymer particles with a blowing agent, preexpanding the particles by heating above the glass transition temperature of the impregnated polymer, placing the particles in a mold and heating to fully expand to a molded article. The improvement comprises using as blowing agent, a tertiary ether selected from the group consisting of methyl tert-butyl ether, methyl tert-amyl ether, ethyl tert-butyl ether, and mixtures of these with hydrocarbon blowing agents having from 4 to 6 carbon atoms in the molecule. The mixtures may be, for example, 50-50 methyl tertiary butyl ether/n-pentane, or 10/90 methyl tertiary butyl ether/cyclopentane. These mixtures, although still containing the hazardous pentanes, are less hazardous than the pentanes alone. The tertiary ethers have greater solubility in most polar polymers than the hydrocarbon blowing agents. Although flammable, the tertiary ethers have less tendency to form peroxides upon storage and concerns of autooxidation would not be a problem.

The polymers suitable for use with the tertiary ether blowing agents are polystyrene, styrene copolymers, polymethyl methacrylate, methyl methacrylate copolymers, polyphenylene oxide, polyvinyl acetate, polyvinyl alcohol, polyurethanes, polyethylene, polypropylene, crosslinked variations thereof and interpenetrating networks thereof. Particularly suitable copolymers of styrene are those copolymers with from 5 to 35 mole percent of maleic anhydride and its derivatives such as the imide, N-alkylimide, N-phenylimide, esters, half acids and half esters. Other suitable copolymers are styrene-acrylonitrile, acrylonitrile-butadiene-styrene, styrene-methyl methacrylate, styrene-acrylic acid, styrene-methacrylic acid, and the rubber-modified high impact styrene copolymers.

The following example is meant to further illustrate the invention, but not to limit the claims.

EXAMPLE I

To a series of 12 oz crown cap bottles were added in order, 100 g of distilled water, 2.0 g of tricalcium phosphate, 0.5 g of 1% solution of sodium dodecylbenzenesulfonate, 100 g of polystyrene beads containing 1% of Bareco 655 wax, and the amounts of various blowing agents shown in the Table I. The bottles were then sealed and heated to 90° C. over ¾ hour, maintained at 90° C. for 2 hours, then heated to 120° C. over ¾ hour, and maintained at 120° C. for 2 hours. The resulting suspension of impregnated beads was then cooled to room temperature, acidified to a pH of 1.4 with hydrochloric acid, the beads separated from the aqueous phase by centrifugation, washed with water, and air dried at room temperature.

The beads were then placed in a steam bucket and exposed for the times shown in the Table, allowed to stand overnight to age, and the density measured. The results are shown in Table I.

TABLE I

| Blowing Agent | Total Volatiles, % | Density, pcf. After 2 Min. | After 3 Min. |
|---|---|---|---|
| n-Pentane, | 5.93 | 1.00 | 0.94 |
| | 5.60 | 1.12 | 1.04 |
| | 5.28 | 1.32 | 1.14 |
| | 4.83 | 1.44 | 1.29 |
| MTBE, | 6.21 | 0.98 | 0.79 |
| | 5.65 | 1.25 | 1.01 |
| | 5.35 | 2.25 | 1.42 |
| | 5.00 | 4.00 | 1.91 |
| MTBE/Pentane, (50/50) | 6.29 | 0.87 | 0.81 |
| | 5.96 | 0.98 | 0.90 |
| | 5.51 | 1.14 | 1.05 |
| | 5.08 | 1.28 | 1.18 |
| MTBE/Pentane, (10/90) | 6.25 | 0.91 | 0.86 |
| | 5.88 | 1.01 | 0.94 |
| | 5.57 | 1.12 | 1.06 |
| | 5.14 | 1.26 | 1.21 |

MTBE is methyl tert-butyl ether

From the Table, it can be seen that the mixtures of MTBE and pentane are better than the pure MTBE when used at lower concentrations in the polystyrene beads.

EXAMPLE II

The process of Example I was repeated except that polystyrene without any Bareco wax added and containing hexabromocyclododecane as flame retardant was used. The results are shown in Table II.

TABLE II

| Blowing Agent | Total Volatile, % | Density, pcf | | |
|---|---|---|---|---|
| | | After 1 min | After 3 min | After 5 min |
| n-pentane | 8.2 | 1.16 | 0.92 | 0.81 |
| MTBE | 8.2 | 1.17 | 0.77 | 0.72 |

MTBE is methyl tert-butyl ether

The ether gives obvious improvement of density when used with the longer times of expansion.

Similar results are expected if the MTBE is replaced with ethyl tert-butyl ether or methyl tert-amyl ether. These ethers are also expected to be efficiently utilized in expansions of polymethyl methacrylate, polyphenylene oxide, polyvinyl acetate, polyvinyl alcohol, polyurethanes, polyethylene, polypropylene, styrene copolymers, and mixtures of these.

We claim:

1. In a process for foaming polymers and copolymers by impregnating polymer particles with a blowing agent, preexpanding the particles by heating above the glass transition temperature of the impregnated polymer, placing the particles in a mold and heating to fully expand to a molded article, the improvement comprising using as blowing agent a tertiary ether selected from the group consisting of methyl tert-butyl ether, methyl tert-amyl ether, ethyl tert-butyl ether, and mixtures of these with hydrocarbon blowing agents having from 4 to 6 carbon atoms in the molecule.

2. The process of claim 1 wherein the polymer being foamed is polystyrene.

3. The process of claim 1 wherein the polymer being foamed is Polymethyl methacrylate.

4. The process of claim 1 wherein the polymer being foamed is polyphenylene oxide.

5. The process of claim 1 wherein the polymer being foamed is polyvinyl acetate.

6. The process of claim 1 wherein the polymer being foamed is polyvinyl alcohol.

7. The process of claim 1 wherein the polymer being foamed is a polyurethane.

8. The process of claim 1 wherein the polymer being foamed is polyethylene.

9. The process of claim 1 wherein the polymer being foamed is polypropylene.

10. The process of claim 1 wherein the polymer being foamed is a styrene copolymer.

* * * * *